United States Patent [19]

Kurozu et al.

[11] Patent Number: 5,117,664
[45] Date of Patent: Jun. 2, 1992

[54] STEERING LOCK FOR AUTOMOTIVE VEHICLE

[75] Inventors: Tomotaka Kurozu, Atsugi; Yoshimitsu Takeda; Mikio Takeuchi, both of Zama; Hiroshi Kato, Isehara, all of Japan

[73] Assignee: Nissan Motor Co., Ltd., Yokohama, Japan

[21] Appl. No.: 318,882

[22] Filed: Mar. 6, 1989

[30] Foreign Application Priority Data

Mar. 7, 1988 [JP] Japan ................................ 63-51466
May 13, 1988 [JP] Japan ............................... 63-114958

[51] Int. Cl.⁵ .............................................. E05B 65/12
[52] U.S. Cl. ................................... 70/252; 70/186
[58] Field of Search .................... 70/252, 185, 186

[56] References Cited

U.S. PATENT DOCUMENTS

| | | | |
|---|---|---|---|
| 3,633,394 | 1/1972 | Pieck | 70/252 X |
| 3,708,032 | 1/1973 | Suzuki | 70/252 X |
| 3,748,877 | 7/1973 | Wolter | 70/186 |
| 3,782,145 | 1/1974 | Wolter | 70/186 |
| 3,828,594 | 8/1974 | Yamamoto | 70/252 |
| 3,859,828 | 1/1975 | Ibuka et al. | 70/252 |
| 4,029,168 | 6/1977 | Kramer | 70/252 |
| 4,487,042 | 12/1984 | Mochida et al. | 70/186 |
| 4,837,567 | 6/1989 | Klefeldt et al. | 70/252 X |

FOREIGN PATENT DOCUMENTS

| | | | |
|---|---|---|---|
| 1817784 | 4/1971 | Fed. Rep. of Germany | 70/252 |
| 2060073 | 6/1971 | Fed. Rep. of Germany | 70/252 |
| 1630069 | 11/1973 | Fed. Rep. of Germany | 70/252 |
| 1780228 | 1/1983 | Fed. Rep. of Germany | 70/252 |
| 57-164841 | 10/1982 | Japan . | |
| 8443 | 1/1983 | Japan | 70/252 |
| 139846 | 8/1983 | Japan | 70/252 |
| 60-124366 | 3/1985 | Japan . | |
| 148749 | 8/1985 | Japan | 70/252 |
| 61665 | 3/1988 | Japan | 70/252 |

Primary Examiner—Renee S. Luebke
Assistant Examiner—Suzanne L. Dino
Attorney, Agent, or Firm—Pennie & Edmonds

[57] ABSTRACT

Sensors such as switches are arranged to detect the insertion of a key into a key cylinder, the rotation of the key to one or more operative positions, the position of a transmission shift level, the depressions of a brake pedal and the like, and to produce signals which are processed by logic circuits in a manner to determine the energization mode and timing of the solenoid or the like motor arrangement in a manner which locks or releases a safety button which must be pressed before the steering column of a vehicle can be locked. The mechanism which performs the locking operation is mounted on the exterior of the housing in which the key cylinder is disposed, thus facilitating assembly.

17 Claims, 7 Drawing Sheets

STEERING LOCK FOR AUTOMOTIVE VEHICLE

BACKGROUND OF THE INVENTION

1. Field of the Invention

The present invention relates to a steering lock for an automotive vehicle and more specifically to a steering lock which is responsive to a number of sensors and which ensures that the steering cannot be locked without a predetermined number of conditions being met.

2. Description of the Prior Art

In commonly used engine ignition key arrangements it is usual to enable the key to be turned to a plurality of different positions such as LOCK, OFF ACC and ON. When the key turned slightly past ON, the engine is cranked by the energization of a cell or starter motor. The ignition key cylinder is normally mounted on the steering column so as to enable the steering to be locked and prevent steering of the vehicle.

JP-A-57-164841 discloses an arrangement wherein a safety button is provided which must be pressed before the steering can be locked by allowing a bolt from being permitted to assume a position wherein it engages the steering shaft in a manner to prevent rotation thereof and before the key can be withdrawn from the key cylinder. Viz., with this arrangement in order to stop the engine and withdraw the key it is necessary to turn the key from the ON position to the ACC (accessory) position, press the button and then rotate key to the LOCK position. This provides a safeguard against possible locking of the steering shaft under conditions wherein it is not desired and can suddenly inhibit steering of the vehicle in a potentially dangerous manner.

However, this arrangement has suffered from the drawbacks that in addition to the intricate lock mechanism it is necessary to include a member which operatively connected with the key cylinder. This member is can, depending on the position in which the key is set, project and a radially extending arcuate portion into a slot formed in a shaft operatively connected with the safety button and thereby lock the shaft to prevent actuation of the button and accidental locking of the steering. This arrangement, though must be included in the housing in which the key cylinder is disposed and therefore complicates both the design and manufacture of the housing.

SUMMARY OF THE INVENTION

It is an object of the present invention to provide a lock arrangement which is responsive to a number of different sensors or switches and which prevent the depression of a safety button which enables locking of the steering column when the ignition key is removed from the key cylinder, until a predetermined number of conditions have been met.

It is a further object of the invention to arrange the mechanism which controls the locking of the steering lock safety button, to be mounted on the exterior of the housing in which the key cylinder is disposed thus permitting a reduction in both the complexity of the housing the assembly operations necessary during the production of the unit.

In brief, the above objects are achieved by an arrangement wherein sensors such as switches are arranged to detect the insertion of a key into a key cylinder, the rotation of the key to one or more operative positions, the position of a transmission shift lever, the depressions of a brake pedal and the like, and to produce signals which are processed by logic circuits in a manner to determine the energization mode and timing of the solenoid or the like motor arrangement in a manner which locks or releases a safety button which must be pressed before the steering column of a vehicle can be locked.

More specifically, the present invention comprises a steering lock arrangement for an automotive vehicle which has a steering column and a transmission shift lever, the arrangement featuring: a key cylinder into which a key can be selectively inserted, said key cylinder being arranged to permit the insertion and removal of the key when the key cylinder assumes a first position, said key cylinder being arranged so that said key can be rotated to a second position; inhibiting means associated with said key cylinder for selectively preventing the locking of said steering column until a predetermined set of conditions are met, said inhibiting means including a manually operable button which must be pushed before the key can be rotated into said first position, removed from said key cylinder and said steering column locked, said inhibiting means comprising: a first sensor, said first sensor being arranged to produce a first signal indicative of the key being inserted into said key cylinder; a second sensor, said second sensor being arranged to sense the position of said key and to produce a second signal when said key is in said second position; a third sensor, said third sensor being arranged to sense said shift lever being moved to a position wherein the output shaft of the transmission is locked against rotation and to produce a third signal indicative thereof; a solenoid, said solenoid being operatively connected with a lever in a manner wherein, when energized in a first manner said button is locked and prevented from being pushed and when energized in a second manner said button is released and assumes an operative condition; and circuit means for controlling the energization of said solenoid, said circuit means being responsive to said first, second and third sensors.

DETAILED DESCRIPTION OF THE PREFERRED EMBODIMENTS

Figure 3:
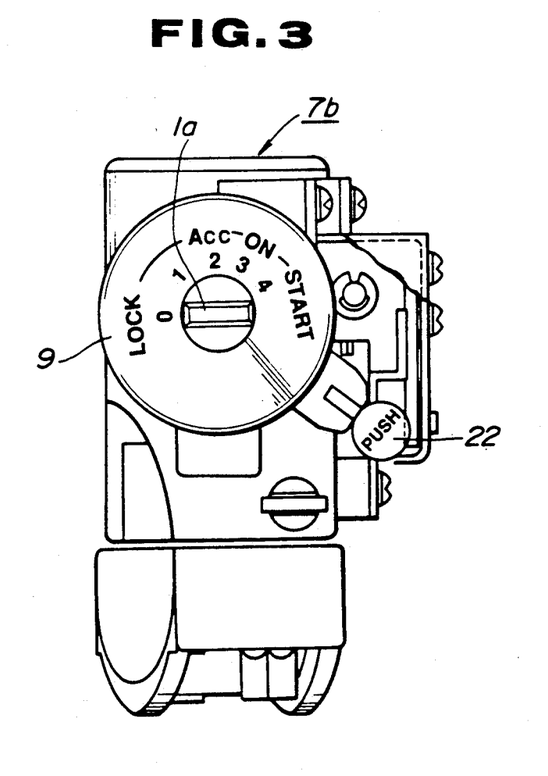
FIG. 3 is a front elevation of an ignition switch housing in which a key cylinder is disposed and on which an arrangement according to a first embodiment of the present invention is disposed.

As shown in FIG. 3 a first embodiment of the present invention features a key cylinder 9 which is disposed within a cylindrical housing 7b. The key cylinder is formed with a slot 1a into which a key (not shown) can be inserted. A button 22 is mounted on the housing below and to the left of the key cylinder. A solenoid 18 and its associated mechanism is included in the housing in the manner illustrated in FIG. 4.

Figure 2:
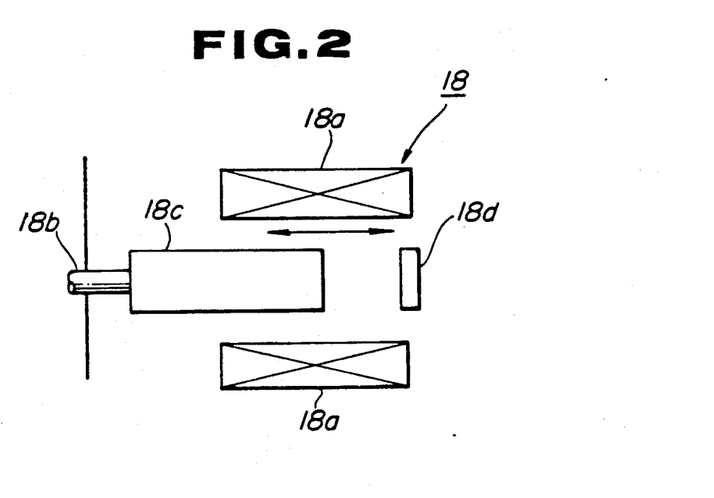
FIG. 2 is schematic plan view showing the constructional features of a solenoid used in the first embodiment.

FIG. 2 shows the solenoid arrangement in schematic form. As will will be understood, this arrangement includes a solenoid coil 18a, an actuator rod 18b which can be moved in the direction indicated by the double headed arrow. The arrangement further includes a plunger 18c and a permanent magnet 18d which is located at a level proximate one end of the cylindrical solenoid coil 18a. With this arrangement, when the solenoid coil 18a is energized by passing a current in a first predetermined direction through the coil, the plunger 18c and actuator rod 18b are induced to move toward and become attached to the permanent magnet 18d in a manner which holds the same in a first predetermined position. On the other hand, when the coil 18a is energized by passing current through the same in a second direction which is opposite the first, the plunger 18c and actuator rod 18b are subject to a bias which separates the plunger 18c from the magnet 18d and moves the combination of plunger and rod to a second predetermined position.

Figure 4:
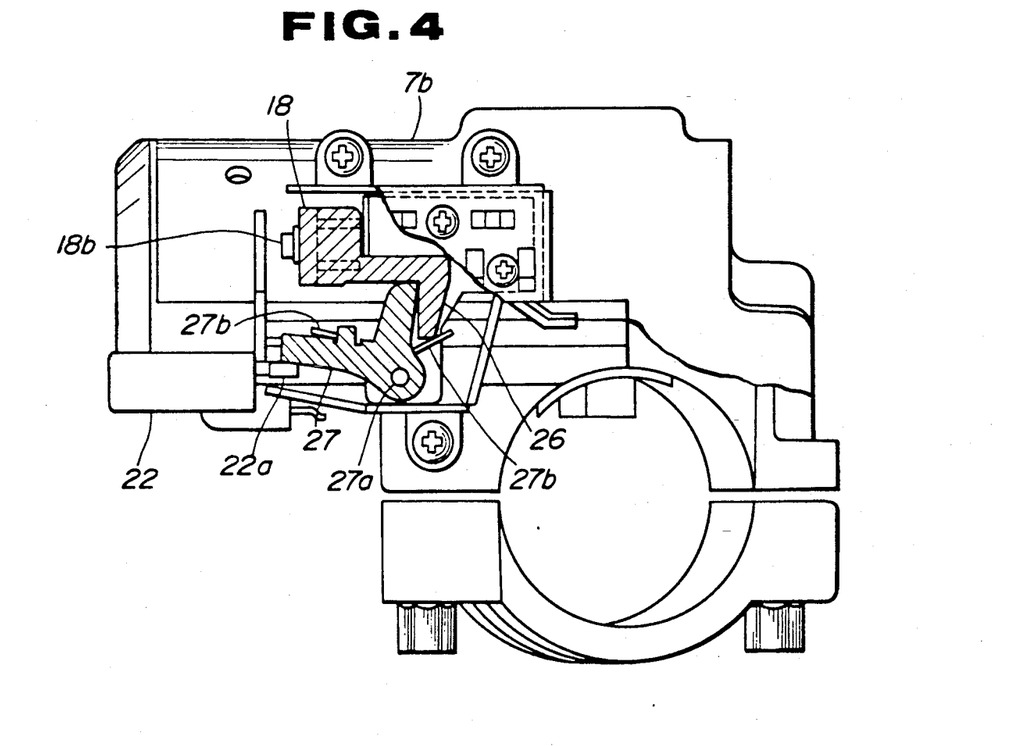
FIGS. 4 and 5 are side elevational and plan view of the arrangement shown in FIG. 3.
Figure 5:
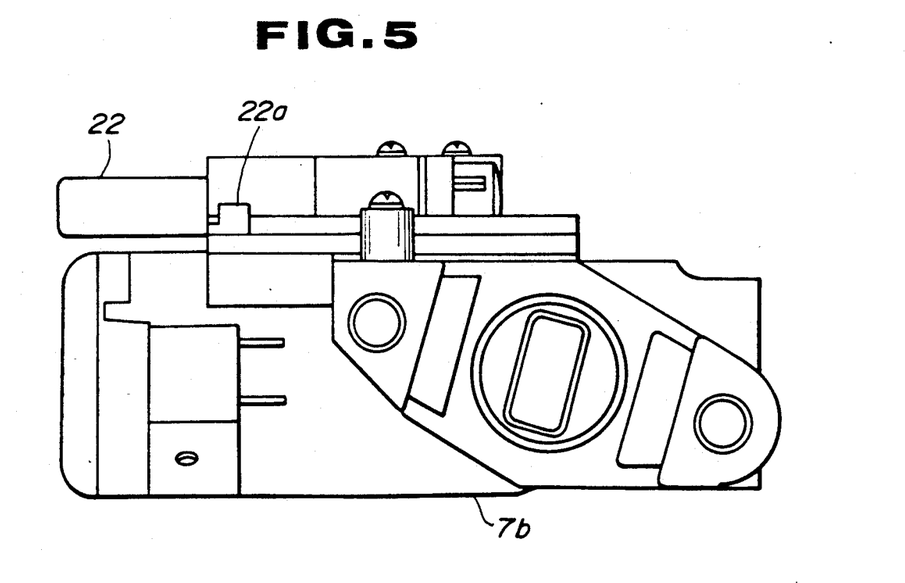

FIGS. 4 and 5 show details of the solenoid and the arrangement of the peripheral apparatus which is associated therewith. As will be appreciated, the actuator rod 18b is connected with a lever 26 in a manner wherein both undergo synchronous movement. A pivotal bell-crank like lever 27 is arranged to be pivotal about a shaft 27a. This lever is arranged to engage a downwardly depending leg of the lever 26 at one end thereof in the manner shown in FIG. 4.

The release button 22 is formed with an projection 22a which has a L shape (best seen in FIG. 5). In the situation illustrated in FIG. 4. the lever 26 pushes against a projection 27b, thereby rotating the pivotal lever 27, thereby permitting the release button to be pushed and for the L shaped projection 22a to slide along the lower edge of the pivotal lever 27. This situation is induced by the energization of the coil 18a in a manner which moves the plunger into contact with the permanent magnet.

Figure 6:
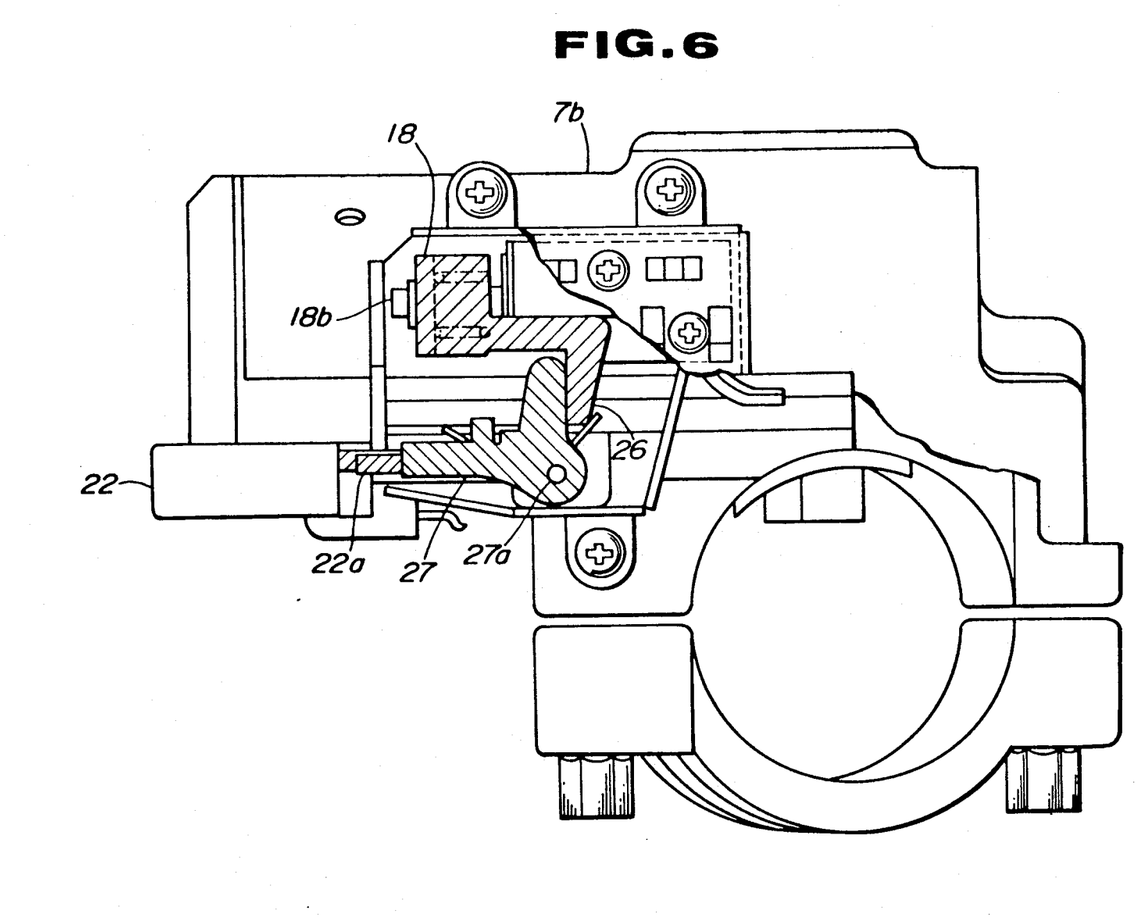
FIG. 6 is a view similar to FIG. 4 but which shows the safety button locked against operation.

On the other hand, when the situation illustrated in FIG. 6 is induced by energizing the coil in manner to move the plunger 18c and the associated actuator rod 18b away from the permanent magnet 18d (to the left as seen in the FIGS. 4–6) the levers 26 and 27 are moved in a manner wherein the end of the lever 27 is induced to engage the end of the L shaped projection 22a and prevent the depression of the button 22. As will be noted, the location where engagement between the L shaped projection 22a and the lever 27 is in approximate alignment with the shaft 27a, the button is adequately locked against movement even when strongly pressed.

Figure 1:
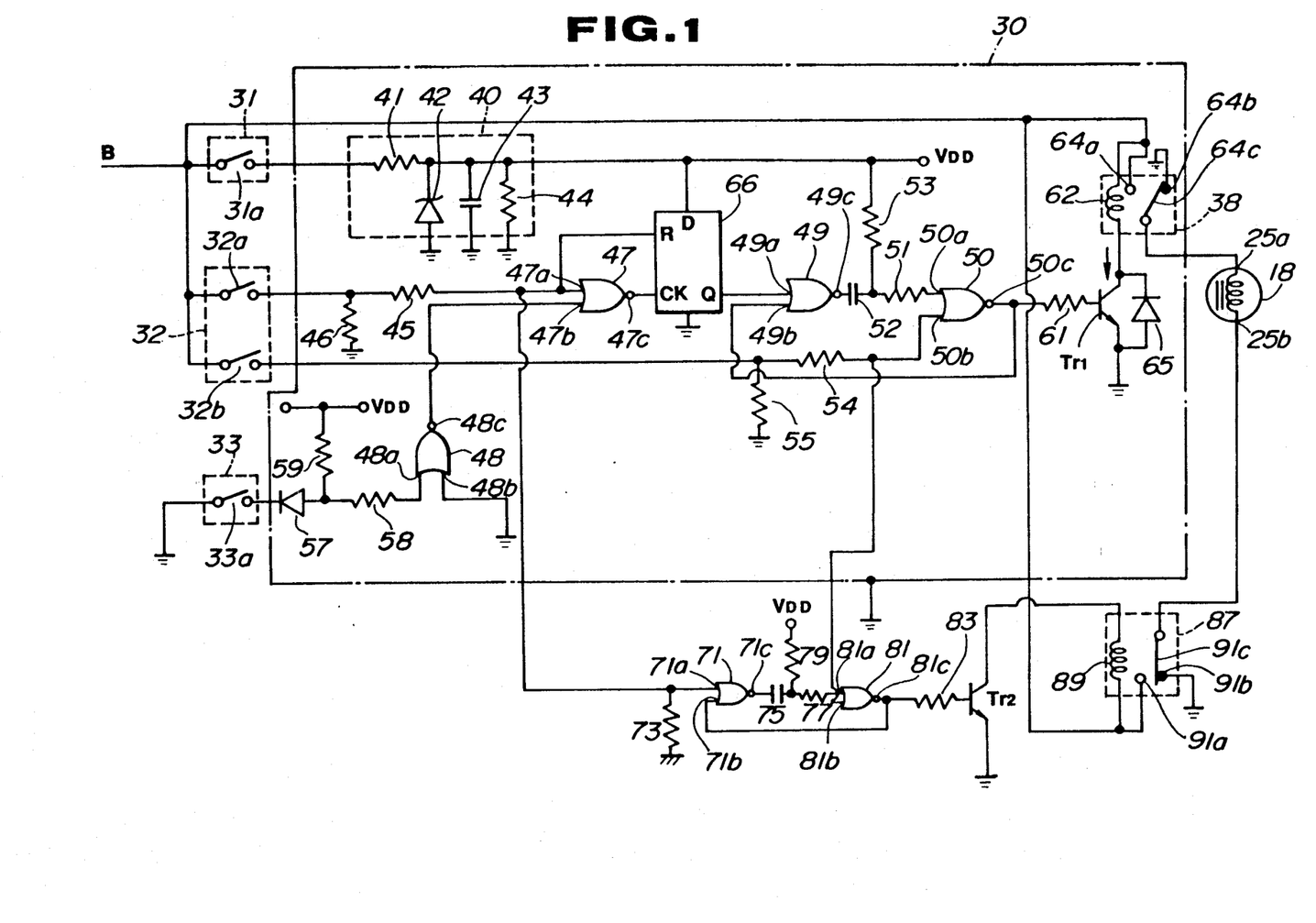
FIG. 1 is a circuit diagram showing the circuitry which is used in connection with a first embodiment of the present invention.

FIG. 1 shows the circuit arrangement 30 which is used in the instant embodiment to control the energization of the solenoid coil 18a. In this circuit, a switch 31 is arranged in the housing 7b to detect the insertion of a key K into the key cylinder 9. This switch 31 includes a contact 31a which is arranged to be closed when the key is inserted into the cylinder. In order to stabilize the voltage supplied from a battery B, a battery voltage stabilizer circuit 40 is arranged in series with the key insertion detection switch 31. This stabilizer circuit includes a first resistor 41, a Zener diode 42, a condenser 43 and a second resistor 44 which are arranged and connected in the illustrated manner. This circuit is arranged to convert the battery supply voltage (e.g. 12 volt) to a stabilized voltage Vdd (e.g. 5 volt by way of example).

An ignition switch arrangement 32 is arranged to include first and second switch contacts 32a and 32b. The first contact 32a is arranged to be closed and assume and ON state when the key K is turned to the ACC, ON, or START position. The second contact 32b is arranged to be closed in addition to the first, when the key K is rotated to the ON or START positions.

The first switch 32a is connected via resistors 45 and 46 with an input terminal 47a of a NOR gate 47. The other input terminal of the NOR gate 47 is connected to the output terminal 48c of a second NOR gate 48.

An input terminal 47a is also connected with the reset terminal of a D flip flop circuit 66. The output terminal 47c of the NOR gate 47 is connected to the CK input terminal of the same flip flop circuit 66. The D input terminal of the flip flop 66 is connected to the voltage stabilizer circuit 40 in a manner to be supplied with a stabilized voltage having the above mentioned predetermined level. The output terminal Q of the flip flop 66 is connected to the input terminal 49a of a third NOR gate circuit 49. The other input terminal 49b of this circuit is connected to the output 50c of a fourth NOR gate 50. Accordingly, the output of the NOR gate 50 is fed back to the NOR gate 49.

The output terminal 49c of the NOR gate 49 is connected to the input terminal 50a of the fourth NOR gage 50 via a resistor 51 and a condenser 52. A node defined between the resistor 51 and the condenser 52 is connected by way of a resistor 53 with the voltage stabilizer circuit 40. The input terminal 50b of the NOR gate 50 is connected by way of resistors 54 and 55 with the ignition switch contact 32a which is closed when the ignition key is rotated to the ON position.

A switch 33, which is arranged to detect the transmission shift lever being set in a parking position (automatic transmission), is connected with the control circuit 30. If the vehicle is provided with an automatic transmission, this switch can take the form of a so called inhibitor switch which is normally connected to the side of the transmission and responsive to the movement of the transmission control or shift lever.

In this arrangement, the switch 33 includes a switch contact 33a which is opened only when the shift lever is moved into the above mentioned park position. The switch 33 is connected by way of a diode 57 and a resistor 58 with one of the input terminals 48a of the NOR gate 48. A resistor 59 is connected between a node, defined between the diode 57 and the resistor 58, and the source of stabilized voltage. The other terminal 48b of the NOR gate 48 is connected with ground.

The output terminal 50c of the NOR gate 50 is connected by way of a resistor 61 with the base of a transistor Tr1. The emitter of this transistor is connected to its own collector and the coil 62 of a relay 38. A diode 65 is connected between the emitter and the collector of the transistor Tr1 in the illustrated manner. The relay 38 further includes a plurality of contacts.

The coil 62 and a fixed contact 64a are connected with the battery B, while a fixed contact 64b is connected with ground. The movable contact 64c is normally biased to engage the contact 64d. When current flows through the coil 62 the movable contact 64c is moved away from the fixed contact 64b into engagement with the fixed contact 64a. When this occurs, the battery B is connected to the solenoid coil 18a of the solenoid 18 in a manner wherein current is supplied to the terminal 25a of the same. Under these conditions the situation shown in FIG. 4 is induced and actuation of the button 22 is rendered possible.

The input terminal 47a of the NOR gate 47 is connected with an input terminal 71a of an NOR gate 71. The input terminal 71a is also connected to ground through resistor 73 while the other input terminal 71b is connected with the output terminal 81c of a NOR gate 81 in a manner to define a feedback loop.

The output terminal 71a of the NOR gate 71 is connected by way of a condenser 75 and a resistor 77 with one input 81a of a NOR gate 81. A resistor 79 is connected to a node defined between the condenser 75 and the resistor 77, and the source of rectified voltage Vdd in the illustrated manner.

Input terminal 81b of the NOR gate 81 is connected with the input terminal 50b of the NOR gate 50 while the output terminal of the NOR gate 81 is connected by way of resistor 83 to the base of a transistor Tr2. The emitter of this transistor is connected to ground while collector is connected to a coil 89 of the relay 87. This relay has a plurality of contacts. In this instance, a fixed contact 91a is connected to the battery B, while a fixed contact 91b is connected to ground. A movable contact 91c is arranged to normally engage the fixed contact 91b. When the when coil 89 is energized the contact 91c is induced to move to contact 91a. As shown, this movable contact 91c is connected to a terminal 25b of the solenoid 18a.

When the coil 89 is energized, the movable contact is moved across to engage the fixed contact 91a and thus connect the terminal 25b with the battery B. This induces a flow of current through the solenoid coil 18a in a direction which causes the actuator rod to move in a manner which induces the situation shown in FIG. 6, wherein depression of the button 22 is prevented.

The operation of the above described embodiment is as follows: When the engine is not running and the key K is inserted into the key cylinder 9, the contact 31a is closed and the condenser 52 is permitted to charge. After a predetermined period the input terminal 50a of the NOR gate 50 receives a signal having a high level. Under these conditions, the NOR gate 50 outputs a signal having a low level to the base of the transistor Tr1 which accordingly assumes a non-conductive state (OFF), and the relay 38 is conditioned so that the movable contact 64c remains in contact with the fixed contact 64b.

When the key K is turned toward the START position, the key firstly reaches the ACC position. At this time the ACC detection switch contact 32a is closed and a high level signal is supplied to the input terminal 71a of the NOR gate 71. The NOR gate responds by changing the output at the terminal 71c to a low level and permits condenser 75 to rapidly discharge. A predetermined time following this event the level of the signal appearing on the input terminal 81a of the NOR gate 81 is maintained at low level due to the controlled re-charging of the condenser 75.

On the other hand, while the key K is in the ACC position, the input terminal 81b of the NOR gate 81 is supplied with a low level signal due to the switch contact 32b being open. As a result, both of the input terminals of the NOR gate 81 receive low level signals and the gate outputs a high level on terminal 81c. This signal is applied to the base of the transistor Tr2 rendering it conductive. The coil 89 is energized, the movable contact 91c is moved from the fixed contact 91b to the fixed contact 91a, and current is supplied to the terminal 25b of the solenoid coil 18a from the battery B. Under these conditions actuator rod 18b is moved outwardly within the solenoid coil 18a and button 22 is prevented from being depressed. Viz., with the above arrangement when the key is moved past the ACC position, the button 22 is locked against depression.

It should be noted, that only during the predetermined time for which the condenser 75 is re-charging and maintains the signal applied to the input terminal 81a of the NOR gate 81 at a low level, can the latter mentioned gate produce a high level signal on its output terminal 81c. Accordingly, the high level of the signal generated by the NOR gate 81 is maintained for the same period of time. During this period the transistor Tr2 assumes a conductive state. Upon the expiration of the predetermined period transistor Tr2 assuming an OFF state, the movable contact 91c of the relay 87 is then moved back from fixed contact 91a to 91b and the load on the solenoid disappears. The low level signal appearing on the output terminal 81 is fed back to the input terminal 71b of the NOR gate.

When the vehicle is running, the key K is set in the ON position. Accordingly, the key detection switch contact 31a remains closed. Further, when the key is in the ON position, the ACC position sensing contact 32a is also arranged to be closed. In addition to this, the shift lever is not set in parking and thus the parking detection contact 33a assumes a closed state. Accordingly, the input terminal 48a of the NOR gate 48 receives a low level signal and induces the output thereof to assume a high level.

As each of the inputs 47a and 47b are high level signals, the NOR gate 47 is induced to produce a low level signal which is fed to the clock terminal CK of the D type flip flop circuit 66. The reset terminal R of this circuit is supplied with a high level signal under these circumstances whereby the signal appearing on the output terminal Q assumes a low level. At the same time, as both of the input terminals of the NOR gate 50 receives high level signals, this circuit is induced to output a low level signal on its output terminal. This signal is fed back to the input terminal 49b of the NOR gate 49. Accordingly, the signals appearing on both terminals of the NOR gate 49 assume low levels and induce the output of a high level signal on output terminal 49c. In response, the condenser 52 does not charge and the input terminal 50a of NOR gate 50 continues to be supplied with a high level signal. Accordingly, the output of the NOR gate assumes a low level and the transistor Tr1 is maintained in a non-conductive state. Under these conditions, coil 62 of the relay 38 is not supplied with current and the movable contact 64c remains in engagement with fixed or stationary contact 64b. This grounds the terminal 25a of the solenoid coil 18a and maintains the coil in a de-energized state. Accordingly, the actuator rod 18b is not retracted and is maintained in a projected state. Thus, while the vehicle is running the steering lock button 22 is locked safely in position.

When the vehicle comes to a stop and the shift lever is set in parking, the parking position detection switch contact 33a is opened. Under these conditions, the NOR gate 48 input terminal 48a receives a high level signal as the connection with ground is broken. The output of this gate circuit is therefore reduced to a low level.

When the key is rotated to the OFF position which is located between the ACC and the LOCK positions, the ON position detection switch contact 32b and the ACC position detection switch contact 32a are both rendered open. This causes both of the input terminals of the NOR gate 47 to receive low level signal and induce the output of a high level one. This high level signal is supplied to the clock circuit terminal CK of the D flip flop 66 inducing the output of high level signal on terminal Q. The NOR gate 49 input terminal 49a receives the high level signal and accordingly induces the output of a low level signal which allows the condenser 52 to begin accumulating charge. During the predetermined period the condenser 52 is accumulating charge, the signal appearing on the input terminal 50a of the NOR gate 50 is maintained at a low level and the output of the circuit is maintained at a high level. Under these conditions, the application of the high level signal to the base of the transistor Tr1 rendering the same conductive. Coil 62 is energized and the movable contact 64c is moved from the stationary contact 64b to 64a. Terminal 25a of the solenoid coil 18a is connected with the battery B and the actuator rod 18b is induced to move inwardly under the influence of the current flowing through the coil 18a. This induces the situation shown in FIG. 4 wherein the locking of the steering lock button 22 is removed, and upon said button being depressed, permits the key K to be rotated to the LOCK position and the steering column to be locked.

It should be noted that the low level signal appearing on terminal 50a is only maintained for a short predetermined period while the condenser 52 is accumulating charge. At the end of this period the level of the signal outputted by the NOR gate 50 drops to a low level whereby the transistor Tr1 is rendered non-conductive, coil 62 is de-energized and the movable contact 64c is permitted to move back to the fixed contact 64b. This induces the selective de-energization of the solenoid coil 18a. Further, upon the high level of the NOR gate 50 falling to a low level, the change in level is fed back to the input terminal 49b.

As will be appreciated from the foregoing description, in accordance with the outputs of NOR gates 47 and 49 and D flip flop 66, when the vehicle is no longer being driven, and the transmission shift lever is set in parking, as long as the key K is not rotated toward the OFF position, the solenoid 18 is appropriately controlled in a manner which prevents the steering lock button from being operated.

Further, since the solenoid, lever and other members which are motivated by the solenoid are mounted on the exterior of the housing assembly, of the same is facilitated and the cost of the device reduced.

It will be appreciated that although the above embodiment has been described in connection with an actuator rod with is moved axially backwards and forwards it is possible to employ a rotating type arrangement for the purposes of selectively locking the steering lock button.

SECOND EMBODIMENT

Figure 7:
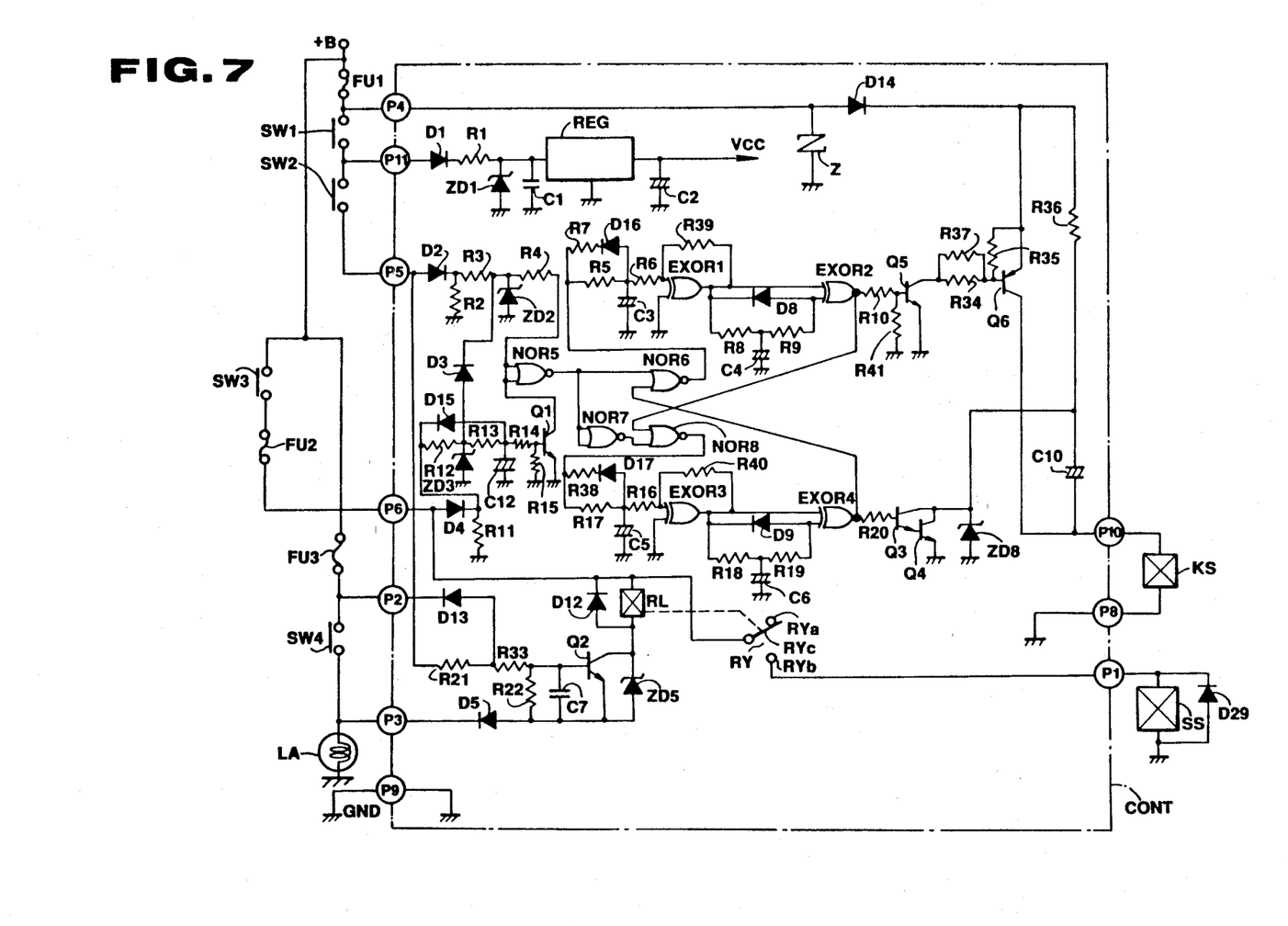
FIG. 7 is a circuit diagram showing the circuitry which is used in connection with a second embodiment of the present invention.

FIGS. 7 to 10 show a second embodiment of the present invention. FIG. 7 shows in circuit diagram form, a control circuit according to the second embodiment. In this figure, B+ denotes a terminal which is connected with a source of positive voltage (e.g. +12 V provided by a battery B). A fuse FU1 is interposed between the terminal B+ and a terminal P4 of the control circuit. A normally open switch SW1 is interposed between the terminal P4 and a second terminal P11. This switch is arranged to be closed only when the key is inserted into the key cylinder. Terminals P11 and P5 are operatively connected by a detente switch SW2. This switch is arranged to closed when the shift lever is moved into the parking position. When the shift lever is in any other position than parking the switch is arranged to be open.

A fuse FU2 is interposed between the terminal B+ and a terminal P6 of the control circuit. A normally open ignition switch SW3 is interposed between the terminal B+ and the fuse FU2. In this instance the ignition switch SW3 is arranged to be closed after the key is turned from the OFF position. The battery is also connected with the terminal P2 by way of a fuse FU3. A brake switch SW4 is interposed between terminals P2 and P3. This brake switch is connected with a non-illustrated brake pedal in a manner to assume a closed condition when the pedal is depressed. The terminal P3 is also connected with a stop lamp (or lamps) LA.

In this arrangement, a terminal P9 grounds the chassis on which the various elements of the circuit are mounted while terminals P10 and P8 have a key lock solenoid KS operatively connected therebetween. A shift lock solenoid SS is operatively connected between the terminal P1 and ground. In this instance, a diode D29 is arranged to connect the ends of the solenoid in the illustrated manner.

The main body of the circuit which is operatively disposed within the above described peripheral arrangement comprises a diode D14, a resistor R36 and a condenser C10 which are connected between the terminals P4 and P10. A diode D1 and a resistor R1 are connected between the terminal P11 and an input terminal of a tri-terminal voltage regulator circuit REG. A Zener diode ZD1 and a condenser C1 are each connected between the input terminal of the REG circuit and ground. A condenser is connected between ground and the output terminal of the REG circuit. This circuit acts as a source of relatively stable voltage Vcc which is supplied to the remainder of the circuit.

A diode D2 and resistors R3, R4 are connected between the terminal P5 and the input terminal of a NOR gate 5. This NOR gate is arranged so that the output terminal thereof is connected to an input terminal of each of NOR gates 6 and 7. The output terminal of a NOR gate 6 is connected by way of resistors R5 and R6 to an exclusive OR gate EXOR1. A diode D16 and a resistor R7 are connected in parallel with the resistor R5. A condenser C3 interconnects a node defined between the resistors R5 and R6 and ground. The output of the exclusive OR gate EXOR1 is connected with a first input terminal of an exclusive OR gate EXOR2. The output of the gate EXOR1 is also connected by way of a resistor R39 to one of its own input terminals in a manner to define a feedback loop, and by way of a diode D8 to the second of the input terminals of the gate EXOR2. A condenser C4 interconnects a node defined between the serially connected resistors R8 and R9 to ground. These resistors as shown are connected in parallel with the diode D8.

In addition, the output terminal of the gate EXOR2 is connected by way of a resistor R10 with the base of a transistor Q5. The base of transistor Q5 is also connected to ground via a resistor R41. The collector of this transistor is connected by way of transistor a R34 to the base of a transistor Q6. A resistor R37 is connected in parallel with the transistor R34 in the illustrated manner. A resistor R35 is arranged to connect the base and the emitter of this transistor. The emitter is connected to the cathode of above mentioned diode D14. The collector of the transistor Q6 is connected with the terminal P10.

The output terminal of a NOR gate 7 is connected to the first input of a NOR gate 8. The second input of the gate NOR8 is connected with the output of the gate EXOR2 while the output of the gate NOR8 is connected with a first input terminal of a gate EXOR3 by way of serially connected resistors R16 and R17. The resistor R17 and a diode D17 are connected in parallel. A condenser C5 connects a node defined between the resistors R16 and R17 with ground. The second input of the gate EXOR3 is connected to ground.

The output of the gate EXOR3 is connected to a first input of the gate EXOR4 while the output of the gate EXOR3 is connected by way of a resistor R40 with its own first input terminal in a manner to define a feedback loop. The output terminal of the gate EXOR3 is also connected by way of a diode D9 to the other input terminal of the gate EXOR4. Serially connected resistors R18 and R19 are connected in parallel with the diode D9. A condenser C6 interconnects a node defined between the resistors R18 and R19 with ground.

The output terminal of the gate EXOR4 is connected with an input terminal of the NOR gate 6 and further to the base of a transistor Q3 via a resistor R20. A further transistor Q4 combines with Q3 to define a Darlington pair wherein the emitters are both connected to ground and the collectors of the two are connected to a Zener diode ZD8 and the condenser C10 in the illustrated manner.

The terminal P6 is connected with the base of a transistor Q1 by way of a diode D4 and resistors R12, R13 and R14. The cathode of the diode D4 is connected to ground via a resistor R11. A Zener diode ZD3 is connected between ground and a node defined between the resistors R12 and R13. A condenser C12 is connected to a node defined between the resistors R13 and R14 and ground.

The base of the transistor Q1 is connected to ground via resistor R15 while the base thereof is connected to the input terminal of the NOR gate 5. The node defined between the resistors R3 and R4 and the node defined between the resistors R12 and R13 are interconnected by a diode D3.

The terminal P6 is also connected with a relay RL. This relay has stationary contacts RYa and RYb and a movable contact RYc; and is connected in parallel with a diode D12.

The terminal P5 is connected with the base of a transistor Q2 by way of resistors R21 and R33. The node defined between these two resistors is connected by way of a diode D13 to the terminal P2. The base and the emitter of the transistor Q2 are connected by way of parallely arranged condenser C7 and resistor R22. The anode of a diode D12 is connected to the collector transistor Q2 while a Zener diode ZD5 is connected between the collector and the emitter thereof.

The emitter of the transistor Q2 is connected to the terminal P3 by way of a diode D5.

The operation of the above described circuit will now be given with reference to the timing charts shown in FIGS. 8 and 9.

Firstly, let it be assumed that at time t1 the key is rotated to the LOCK position and the transmission shift lever is set in parking. In this position the switch SW3 is opened and the switch SW2 is closed.

When the key was inserted into the key cylinder switch SW1 was closed and as a result a high level signal is fed to the an input terminal of the gate NOR5 by way of the switches SW1 and SW2. A low level signal appears on the output of the gate NOR5 and is supplied to an input terminal of the gate NOR6. At this time the signal appearing on the other input of the gate NOR5 also has a low level and results in the generation of a high level signal by the instant circuit. The high level signal appearing on the output terminal of the gate NOR5 is fed to one of the inputs of the gate EXOR1 by way of the gate NOR6. Accordingly, a high level signal appears on the output of the gate EXOR1 and is applied to one of the inputs of the gate EXOR2. The output of the gate EXOR2 goes to high level, is applied to the base of the transistor Q5 and renders the transistors Q5 and Q6 conductive. While the transistor Q6 is conductive, current from the battery B is supplied to the key lock solenoid KS conditioning the same to assume an unlock condition.

The above mentioned operations take place at time points t3, t6, t9 and t11. Viz., when the key assumes one of LOCK, OFF and ACC positions and switch SW2 is closed, whereby the transistors Q5 and Q6 are rendered conductive and current passes though the terminals P8 and P10 and the key lock solenoid KS. Under these conditions as the lock solenoid is conditioned to assume an unlock condition, actuation of the safety button is rendered possible.

It should be noted that in the above state, a high level signal appearing on the output of the gate EXOR2 is applied to one of the inputs of the gate NOR8 and that the gate NOR8 accordingly outputs a low level signal. The gate EXOR3 and EXOR4 both output low level signals whereby the transistors Q3 and Q4 assume nonconductive (OFF) states.

Figure 8:
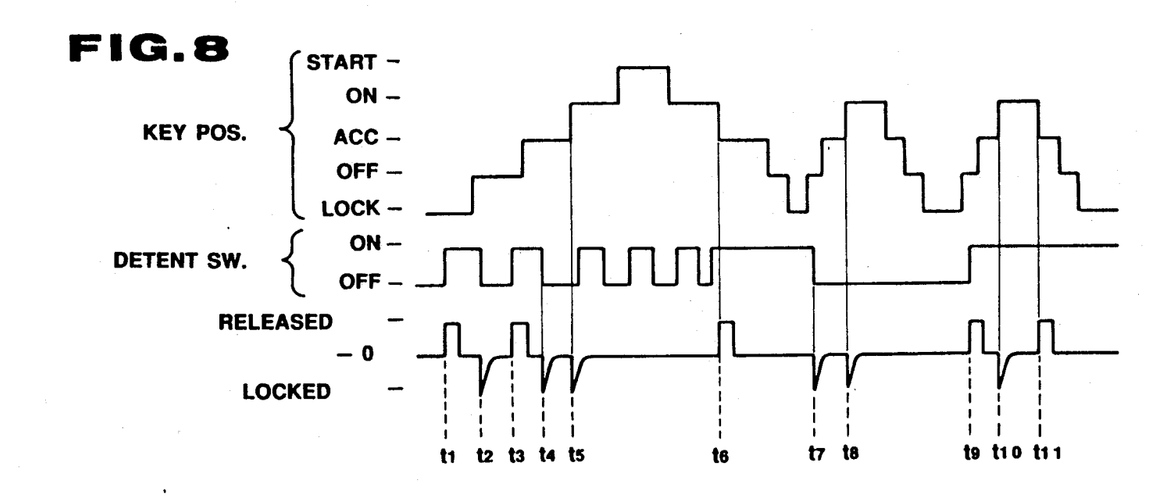
FIGS. 8 and 9 are timing charts which demonstrate the operation of the second embodiment.

At time t2 in FIG. 8 is should be understood that the key is turned to the OFF position while SW2 is open due to the location of the transmission shift lever in a position other than park.

Under these conditions, at time t2 the switches SW2 and SW3 are both open whereby the signals appearing on the terminals P5 AND P6 assume low levels. The inputs to the gate NOR5 assume low levels and induce the output of high level which is applied to the gate NOR7. Gate NOR7 outputs a low level signal to the gate NOR8 which responds by generating a high level one which is supplied to one of the inputs of the gate EXOR3. The output of this circuit goes to a high level and is received by an input of the gate EXOR4.

The gate EXOR4 is induced to output a high level signal which is applied to the gate NOR6 and to the base of the transistor Q3. The transistors Q3 and Q4 are accordingly rendered conductive. Due to the supply of the high level output from the gate EXOR4 to the gate NOR6, the gates EXOR1 and EXOR2 are both conditioned to produce low level signals whereby the transistors Q5 and Q6 are both rendered non-conductive and assume OFF states.

As the transistors Q3 and Q4 are both rendered conductive, the voltage appearing on the collector of the transistor Q4 assumes a zero level. At the same time, the condenser C10 receives a minute amount of current flowing from the battery B via the resistor R36 which develops a positive charge on the resistor R36 side. Under these conditions the voltage appearing at the collector of the transistor Q4 remains at zero while the voltage appearing on the terminal P10 assumes a negative polarity (B−). Current flows from the terminal P8 to the terminal P10 and the solenoid Ks is energized in a manner which induces a locking condition and prevents the lock safety button from being operated.

The above described operations occur at time points t4 and t7 or in other words when the key is in either of the OFF and ACC positions while the transmission shift lever in any position other than parking. Viz., where the switch SW2 is conditioned to assume and OFF or open condition, the transisotrs Q3 and Q4 are rendered conductive, and current can flow from the terminal P8 to the terminal P10 via the key locking solenoid KS. This energization of solenoid KS induces the situation wherein the safety button cannot be depressed and thus prevents any possibility of the steering becoming locked under such conditions.

At time t5 (see FIG. 8) the ignition key is set in the ON position and the switch SW3 is closed. Current flows from the battery B through switch SW3, fuse FU2, terminal P6, diode D4 and current resistors R12, R13, R14 and is applied to the base of the transistor Q1. The transistor Q1 becomes conductive and the output of the gate NOR5 goes to a high level due to its inputs being both at a low level. This induces the gate NOR7 to output a low level signal and the gate NOR8 to output a high level signal. This high level signal is supplied to the gate EXOR3 which responds by producing a high level signal which is supplied to the gate EXOR4. The gate EXOR4 in turn generates a high level signal which is supplied to the base of the transistor Q3 rendering the same conductive. As before, both the transistors Q3 and Q4 are rendered conductive in this situation thus inducing the energization of the solenoid KS and establishing a key locking condition.

Figure 9:
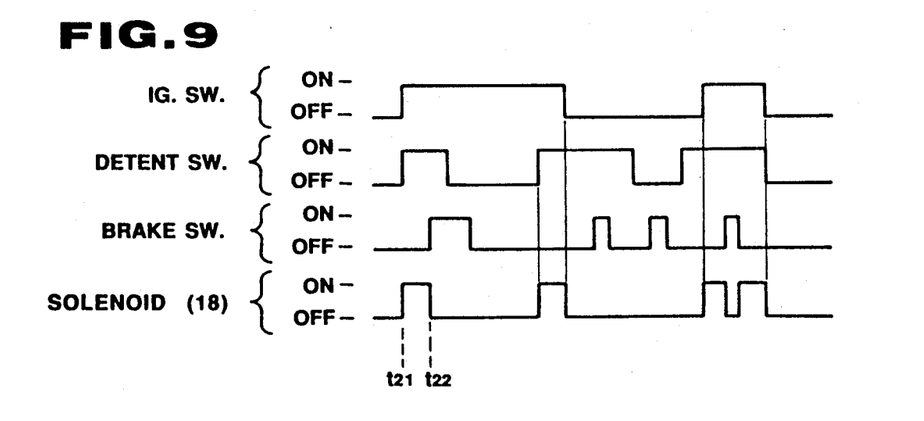

Referring now to FIG. 9, when the transmission shift lever is set in parking and the detent switch is closed (ON), current from the battery is supplied via key switch SW1, detent switch SW2, terminal P5, resistors R21 and R33 to the base of the transistor Q2, rendering it conductive. On the other hand, at time t21 the ignition key is moved to ON position the switch SW3 closes. Current from the battery passes through switch SW3, fuse FU2 and terminal P6 to the relay RL. The relay RL is energized in a manner where the movable contact RYc is moved from the stationary the contact RYa to contact RYb. Current is then transmitted by way of the terminal P1 to a shift lock solenoid SS. Energization of this shift lock solenoid SS induces the locking of the transmission shift lever in the parking position.

At time t22, if the brake is applied, the brake switch SW4 assumes a closed state and current from the battery B is supplied via fuse FU3 and brake switch SW4 to the stop lamp LA and the terminal P3. The stop lamp LA is illuminated and at the same time the signal level at the terminal P3 is raised to a high level. The high level signal appearing on the terminal P3 is impressed on the emitter of the transistor Q2 which rendered non-conductive under the instant circumstances. The relay RL also assumes an OFF state and the movable contact moves from the stationary the contact RYb to contact RYa. This blocks the supply of current to the shift lock solenoid SS and de-energizes the same. Viz., when the brake pedal is depressed it is possible to move the transmission shift lever out of the park position.

With the above described arrangement, in the case of an overload which blows the fuse FU3 by way of example, even if the brake pedal is strongly depressed and the brake switch SW4 closed, the current from battery B is not supplied to the terminal P3. With this, as the diode D13 is arranged between the node defined between resistors R21 and R33 and terminal P2, a low level signal is induced across the stop lamp LA, brake switch SW4, terminal P2, diode D13 and resistor R33. This causes the transistor Q2 to become non-conductive and the relay RL to assume an OFF state. Accordingly, if the fuse FU3 blows the shift lock solenoid cannot be energized and the transmission shift lever cannot be locked in position.

In the embodiment shown in FIG. 7 NOR6, NOR8, EXOR1, EXOR2, EXOR3, and EXOR4 define a so called multi stable multi-vibrator circuit. Viz., the output terminals of the gates EXOR2 and EXOR4 are respectively connected with the inputs of the gates NOR8 and NOR6 in a manner to define a feedback arrangement. Each of the gates EXOR2 and EXOR4 outputs different logic signals.

More specifically, when the gate EXOR2 outputs a high level signal the gate EXOR4 outputs a low level one and vice versa.

During the very brief period required to move the key in the key cylinder and induce the ignition switch SW3 to change from an ON state to an OFF one, in the instant embodiment, one input of the gate EXOR3 is connected with the condenser C5 while one input of the gate EXOR1 is connected with the condenser C3. In the event that the switch SW3 chatters or the like, the condensers C3 and C5 obviate any detrimental effect on the key lock solenoid KS, other condensers etc. However, as the capacity of the condensers is set in accordance with time in which chattering can occur, it is necessary to discharge the same after each occurrence. Viz., if the capacity of condensers C5 and C6 was to be increased, the charging time would become prolonged and the time required to stably establish the lock and released conditions of the would be similarly prolonged. Accordingly, quick response to sudden demands would not be forthcoming and would degrade the sensitivity and performance of the invention.

In the instant embodiment in order to establish the unlocked or released condition promptly, the capacitance of the condenser C3 is rendered smaller than that of the condenser C5.

THIRD EMBODIMENT

Figure 10:
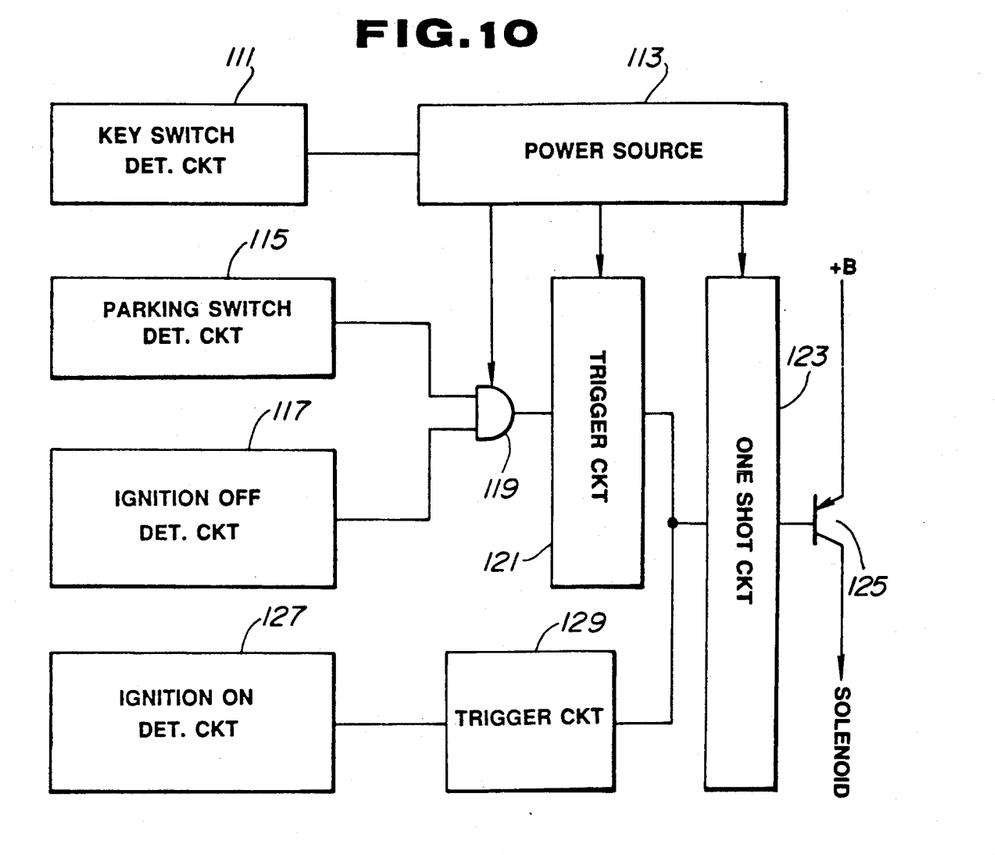
FIG. 10 is a block diagram depicting the arrangement which characterizes a third embodiment of the present invention.

FIG. 10 shows a third embodiment of the present invention. In this arrangement a key detection circuit 111 is connected with a source of power 113 and disposed with the key cylinder in a manner to output a signal when a key is inserted into the key cylinder. A parking detection circuit 115 which is arranged to detect the shift lever of the transmission being set in the park position, is arranged to output a signal when the shift lever is in any position other than the parking one, and is connected along with a ignition OFF detection circuit 117 with a first trigger circuit 121 by way of a logic circuit 119.

A one shot circuit 123 is connected with the first trigger circuit 121 and a second trigger circuit 129. The latter mentioned trigger circuit is connected with an ignition ON detection circuit 127. A transistor 125 is operatively arranged between a battery B and a solenoid which when energized induces a key lock condition. The base of the transistor is connected with the output of the one shot circuit 123.

With this arrangement when the ignition ON detection circuit 127 detects the ignition switch having been closed it is arranged to produces a high level signal. In response to this the second trigger circuit 129 and the one shot circuit 123 are motivated. This induces transistor 123 to become conductive and permits the energization of the solenoid and induces a key lock condition.

FOURTH EMBODIMENT

Figure 11:
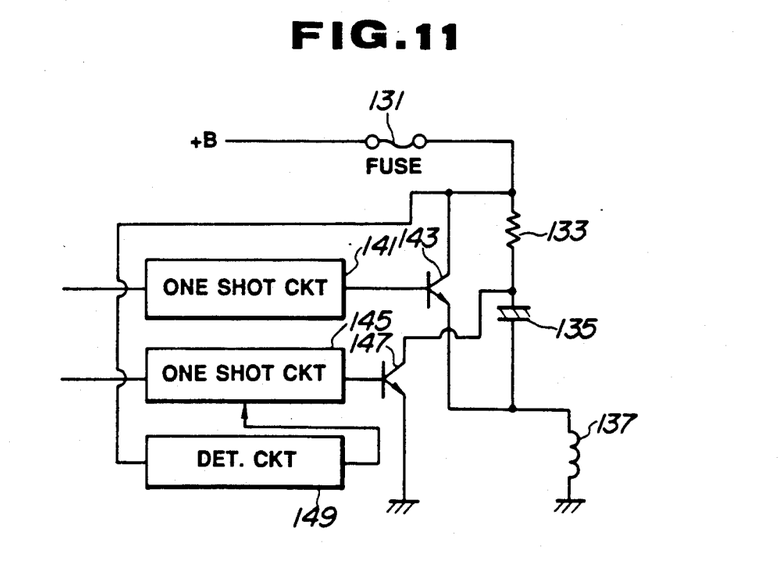
FIG. 11 is a circuit diagram showing the arrangement which characterizes a fourth embodiment of the present invention.

FIG. 11 shows a circuit arrangement which characterizes a fourth embodiment of the present invention. In this circuit, a fuse 131 is interposed between a battery B (source of power) and a resistor 133. A condenser 135 is connected between the resistor 133 and one terminal of a solenoid coil 137. This condenser 135 is arranged to charge on a small current flow during the time when the solenoid is not energized.

When one shot circuit 141 is activated, a high level signal is supplied to the base of transistor 143 and accordingly rendered conductive. Current is permitted to flow through to the solenoid 137 and to energize the same in a manner which induces a key lock condition. When one shot circuit 145 is activated, a transistor 147 is rendered conductive and current is permitted to flow from a node defined between the resistor 133 and the capacitor 135, to ground, thus reducing the voltage appearing at this point to zero. This induces current to flow through the solenoid in the reverse direction and reverses the above mentioned lock condition into a unlock or released status.

In the FIG. 11 arrangement, the detection circuit 149 is provided in order to detect the status of the fuse 131. This circuit is arranged so that, if the fuse blows, the one shot circuit 145 is activated, thereby grounding the capacitor and automatically ensuring the release of any locked condition that might have been induced.

Although not specifically indicated, it is deemed apparent to those skilled in the art to connect switches and the like and the two one shot circuits 141 and 147 of the fourth embodiment to any necessary intervening circuitry. Accordingly, disclosure relating to the same has been omitted for brevity.

What is claimed is:

1. In a steering lock arrangement for an automotive vehicle, said vehicle having a steering column and a transmission shift lever, said steering lock arrangement comprising:
    a key cylinder into which a key can be selectively inserted, said key cylinder being arranged to permit the insertion and removal of the key when the key assumes a first position wherein locking means associated with said key cylinder locks said steering column, said key cylinder being arranged so that said key can be rotated to a second position, wherein the locking means releases said steering column and wherein said key cylinder is conditioned to prevent the removal of said key therefrom;
    inhibiting means associated with said key cylinder for selectively preventing the locking of said steering column until a predetermined set of conditions are met, said inhibiting means including:
    a manually operable button which must be manually operated before the key can be rotated from said second position to said first position;
    a first sensor, said first sensor being arranged to produce a first signal indicative of the key being inserted into said key cylinder;
    a second sensor, said second sensor being arranged to sense the position of said key and to produce a second signal when said key is in said second position;
    a third sensor, said third sensor being arranged to sense said shift lever being moved to a position wherein an output shaft of the transmission is locked against rotation and to produce a third signal indicative thereof;
    a lever for locking said button and preventing manual operation thereof;
    a solenoid, said solenoid being operatively connected with said lever in a manner wherein, when said solenoid is energized in a first manner said lever is moved to a locking position wherein said button is locked and prevented from being manually operated, thereby preventing the rotation of said key from said second position to said first position, and when said solenoid is energized in a second manner said lever is rotated to a release position wherein said button is unlocked and assumes an operative condition; and
    circuit means for controlling the energization of said solenoid, said circuit means being responsive to said first, second, and third sensors.

2. A steering lock arrangement as claimed in claim 1 further comprising:
    a fourth sensor, said fourth sensor being arranged to sense the application of a brake of the vehicle;
    a shift lever locking device, said shift lever locking device having a first state wherein said shift lever is locked in said position wherein said transmission output shaft is locked against rotation and a second state wherein said shift lever is movable to a different position;
    said circuit means being responsive to said fourth sensor for conditioning said shift lever locking device to produce said second state.

3. A steering lock arrangement as claimed in claim 1 wherein said key cylinder is disposed within a housing and said lever and said button are disposed externally of the housing in a manner which facilitates assembly of the arrangement.

4. A steering lock arrangement as claimed in claim 1 further comprising:
    a housing, said key cylinder being disposed in said housing;
    a unit detachably connected to the exterior of said housing, said unit including said lever and said solenoid, said solenoid including a movable plunger;
    a permanent magnet, said permanent magnet being rigidly mounted on said unit and arranged to hold the solenoid plunger in a predetermined position following the energization of said solenoid in said first manner whereby said lever is moved away from said locking position, said plunger being pulled free of said permanent magnet in response to the energization of said magnet in said second predetermined manner whereby said lever is rotated to said locking position, said plunger being operatively held in said predetermined position by said permanent magnet.

5. In a steering lock arrangement for an automotive vehicle, said vehicle having a steering column and a transmission shift lever, said steering lock arrangement comprising:

a key cylinder into which a key can be inserted, said key cylinder being arranged to permit the insertion and removal of the key when the key cylinder assumes a first position, said key cylinder being arranged so that said key can be rotated to a second position;

said key being able to rotate to a third position; and inhibiting means being associated with said key cylinder for selectively preventing the locking of said steering column until a predetermined set of conditions are met, said inhibiting means including a manually operable button which must be pushed before the key can be rotated into said first position, said inhibiting means comprising:

a first sensor, said first sensor being arranged to produce a first signal indicative of the key being inserted into said key cylinder;

a second sensor, said sensor being arranged to sense the position of said key and to produce a second signal when said key is in said second position and produce a third signal when said key is in said third position;

a third sensor, said third sensor being arranged to sense said shift lever being moved to a position wherein the output shaft of the transmission is locked against rotation and to produce a fourth signal indicative thereof;

a solenoid, said solenoid being operatively connected with a lever whereby when said solenoid is energized in a first manner said button is locked and prevented from being pushed, thereby preventing the rotation of said key from said second state to said first state, and when said solenoid is energized in a second manner said button is released and assumes an operative condition; and circuit means for controlling the energization of said solenoid, said circuit means being responsive to said first, second, and third sensors.

6. A steering lock arrangement for an automotive vehicle which has a steering column, comprising:

a key cylinder into which a key can be selectively inserted, said key cylinder being arranged to permit the insertion and removal of the key when said key is in a first position and the key cylinder assumes a first state, said key cylinder being arranged so that said key can be rotated from a first position to a second position and induce said key cylinder to assume a second state wherein the key cannot be removed from the key cylinder; locking means associated with said key cylinder for locking said steering column against rotation when said key is in said first position;

a manually operable button which prevents the rotation of said key from said second position to said first position until said button is manually operated;

inhibiting means for locking said button and preventing said button from being manually operated, thereby preventing the rotation of said key from said second position to said first position;

sensing means operatively connected to said inhibiting means for sensing a plurality of vehicle operating conditions;

said inhibiting means unlocking said button and permitting said button to be manually operated, when a predetermined set of vehicle operating conditions have been sensed by said sensing means.

7. A steering lock arrangement as claimed in claim 6 wherein said inhibiting means comprises:

a key insertion sensor, said key insertion sensor being arranged to produce a key insertion signal indicative of the key being inserted into said key cylinder.

8. A steering lock arrangement as claimed in claim 6 wherein said inhibiting means comprises:

a key position sensor, said key position sensor being arranged to produce a key position signal when said key is in said second position.

9. A steering lock arrangement as claimed in claim 6 wherein said inhibiting means comprises:

a brake sensor, said brake sensor, sensor being arranged to produce a brake signal when the brake of the vehicle is applied;

a shift lever locking device, said shift lever locking device having a first state wherein said shift lever is locked in said position wherein said transmission output shaft is locked against rotation and a second state wherein said shift lever is movable to a different position; and circuit means responsive to said brake sensor for conditioning said shift lever locking device to produce said second state.

10. A steering lock arrangement for an automotive vehicle which has a steering column, said steering lock arrangement comprising:

a key cylinder into which a key can be selectively inserted, said key cylinder being arranged to permit the insertion and removal of the key when said key is in a first position and the key cylinder assumes a first state, said key cylinder being arranged so that said key can be rotated from a first position to a second position and induce said key cylinder to assume a second state, wherein the key cannot be removed from the key cylinder; locking means associated with said key cylinder for locking said steering column against rotation when said key is in said first position;

a manually operable button which prevents the rotation of said key from said second position to said first position until said button is manually operated;

inhibiting means for locking said button and preventing said button from being manually operated, thereby preventing the rotation of said key from said second position to said first position;

sensing means operatively connected to said inhibiting means for sensing a plurality of vehicle operating conditions, said sensing means comprising:

a first sensor, said first sensor being arranged to produce a first signal indicative of the key being inserted into said key cylinder;

a second sensor, said second sensor being arranged to sense the position of said key and to produce a second signal when said key is in said second position;

a third sensor, said third sensor being arranged to sense said shift lever being moved to a position wherein an output shaft of the transmission is locked against rotation and to produce a third signal indicative thereof;

said inhibiting means unlocking said button and permitting said button to be manually operated when a predetermined set of vehicle operating conditions have been sensed by said sensing means.

11. A steering lock arrangement for an automotive vehicle which has a steering column, said steering lock arrangement comprising:
a key cylinder into which a key can be selectively inserted, said key cylinder being arranged to permit the insertion and removal of the key when said key is in a first position and the key cylinder assumes a first state, said key cylinder being arranged so that said key can be rotated from a first position to a second position and induce said key cylinder to assume a second state wherein the key cannot be removed from the key cylinder; locking means associated with said key cylinder for locking said steering column against rotation when said key is in said first position;
a manually operable button which prevents the rotation of said key from said second position to said first position until said button is manually operated; inhibiting means for locking said button and preventing said button from being manually operated, thereby preventing the rotation of said key from said second position to said first position;
sensing means operatively connected to said inhibiting means for sensing a plurality of vehicle operating conditions;
said inhibiting means unlocking said button and permitting said button to be manually operated when a predetermined set of vehicle operating conditions have been sensed by said sensing means, said inhibiting means comprising:
a lever for locking said button and preventing manual operations thereof;
a solenoid, said solenoid being operatively connected with said lever in a manner wherein, when said solenoid is energized in a first manner said lever is moved to a locking position wherein said button is locked and prevented from being pushed, thereby preventing the rotation of said key from said second position to said first position, and when said solenoid is energized in a second manner said lever is rotated to a release position wherein said button is released and assumes an operative condition; and
circuit means for controlling the energization of said solenoid, said circuit means being responsive to said sensing means.

12. A steering lock arrangement as claimed in claim 11, wherein said sensing means comprises:
a key insertion sensor, said key insertion sensor being arranged to produce a key insertion signal indicative of the key being inserted into said key cylinder.

13. A steering lock arrangement as claimed in claim 12, wherein said sensing means further comprises:
a key position sensor, said key position sensor being arranged to produce a key position signal when said key is in said second position.

14. A steering lock arrangement as claimed in claim 13, wherein said sensing means further comprises:
a shift lever sensor, said shift lever sensor being arranged to produce a shift lever position signal when said shift lever is moved to a position wherein the output shaft of the transmission is locked against rotation, said inhibiting means being responsive to said shift lever sensor in a manner that the operation of said manually operable device is inhibited until such time as said shift lever sensor produces said shift position signal.

15. A steering lock arrangement as claimed in claim 14, wherein:
said sensing means further comprises a brake sensor, said brake sensor being arranged to produce a brake signal when the brake of the vehicle is applied; and
said inhibiting means further comprises a shift lever locking device, said shift lever locking device having a first state wherein said shift lever is locked against rotation and a second state wherein said shift lever is movable to a different position; and
circuit means responsive to said brake sensor for conditioning said shift lever locking device to produce said second state.

16. A steering lock arrangement for an automotive vehicle which has a steering column, said steering lock arrangement comprising:
a key cylinder into which a key can be selectively inserted, said key cylinder being arranged to permit the insertion and removal of the key when said key is in a first position and the key cylinder assumes a first state, said key cylinder being arranged so that said key can be rotated from a first position to a second position and induce said key cylinder to assume a second state wherein the key cannot be removed from the key cylinder; locking means associated with said key cylinder for locking said steering column against rotation when said key is in said first position;
a manually operable button which prevents the rotation of said key from said second position to said first position until said button is manually operated; inhibiting means for locking said button and preventing said button from being manually operated, thereby preventing the rotation of said key from said second position to said first position;
sensing means operatively connected to said inhibiting means for sensing a plurality of vehicle operating conditions, said sensing means comprising:
a first sensor, said first sensor being arranged to produce a first signal indicative of the key being inserted into said key cylinder;
a second sensor, said second sensor being arranged to sense the position of said key and to produce a second signal when said key is in said second position;
a third sensor, said third sensor being arranged to sense said shift lever being moved to a position wherein the output shaft of the transmission is locked against rotation and to produce a third signal indicative thereof; and
a fourth sensor, said fourth sensor being arranged to sense the application of a brake of the vehicle;
said inhibiting means comprising:
a shift lever locking device, said shift lever locking device having a first state wherein said shift lever is locked in said position wherein said transmission output shaft is locked against rotation and a second state wherein said shift lever is movable to a different position; and
circuit means responsive to said first, second, third and fourth sensors, said circuit means being responsive to said fourth sensor for conditioning said shift lever locking device to produce said second state;

said inhibiting means unlocking said button and permitting said button to be manually operated when a predetermined set of vehicle operating conditions have been sensed by said sensing means.

17. A steering lock arrangement for an automotive vehicle which has a steering column, said steering lock arrangement comprising:

a key cylinder into which a key can be selectively inserted, said key cylinder being arranged to permit the insertion and removal of the key when said key is in a first position and the key cylinder assumes a first state, said key cylinder being arranged so that said key can be rotated from a first position to a second position and induce said key cylinder to assume a second state wherein the key cannot be removed from the key cylinder;

locking means associated with said key cylinder for locking said steering column against rotation when said key is in said first position;

a manually operable button which prevents the rotation of said key from said second position to first position until said button is manually operated;

inhibiting means for locking said button and preventing said button from being manually operated, thereby preventing the rotation of said key from said second position to said first position; and sensing means operatively connected to said inhibiting means for sensing a plurality of vehicle operating conditions, said sensing means comprising:

a shift lever sensor, said shift lever sensor being arranged to produce a shift lever position signal when said shift lever is moved to a position wherein the output shaft of the transmission is locked against rotation, wherein said inhibiting means being responsive to said shift lever sensor in a manner that the operation of said manually operable device is inhibited until such time as said shift lever sensor produces said shift position signal, said inhibiting means unlocking said button and permitting said button to be manually operated when a predetermined set of vehicle operating conditions have been sensed by said sensing means.

* * * * *